United States Patent
Ambros

(10) Patent No.: US 10,232,558 B2
(45) Date of Patent: Mar. 19, 2019

(54) COMPONENT WITH A FASTENING REGION FOR A THREADED CONNECTION, TOGETHER WITH A MOULDED PART AND A FASTENING PART

(71) Applicant: BAIER & MICHELS GMBH & CO. KG, Ober-Ramstadt (DE)

(72) Inventor: Olaf Ambros, Biblis (DE)

(73) Assignee: BAIER & MICHELS GMBH & CO. KG, Ober-Ramstadt (DE)

( * ) Notice: Subject to any disclaimer, the term of this patent is extended or adjusted under 35 U.S.C. 154(b) by 0 days.

(21) Appl. No.: 15/029,624

(22) PCT Filed: Oct. 14, 2014

(86) PCT No.: PCT/EP2014/071960
§ 371 (c)(1),
(2) Date: Apr. 14, 2016

(87) PCT Pub. No.: WO2015/055614
PCT Pub. Date: Apr. 23, 2015

(65) Prior Publication Data
US 2016/0229117 A1    Aug. 11, 2016

(30) Foreign Application Priority Data
Oct. 14, 2013   (DE) .................. 10 2013 220 718

(51) Int. Cl.
*B29C 65/48*      (2006.01)
*B29C 65/50*      (2006.01)
(Continued)

(52) U.S. Cl.
CPC .......... *B29C 65/48* (2013.01); *B29C 65/5014* (2013.01); *B29C 65/561* (2013.01);
(Continued)

(58) Field of Classification Search
CPC ......... Y10T 428/1366; Y10T 428/1362; Y10T 428/1369; Y10T 428/24331;
(Continued)

(56) References Cited

U.S. PATENT DOCUMENTS 8,263,200 B2 *   9/2012   Barber .................. B29C 70/205
                                                                 156/285

FOREIGN PATENT DOCUMENTS

DE        19849822 A1      5/2000
DE        102004046559 A1  4/2006
DE        202011103246 U1  11/2011

OTHER PUBLICATIONS

English Translation of the WIPO "International Preliminary Report", PCT Application No. PCT/EP2014/071960, dated Apr. 19, 2016, 8 pages.
(Continued)

*Primary Examiner* — Alexander S Thomas
(74) *Attorney, Agent, or Firm* — Mannava & Kang, P.C.; Adesh Bhargava

(57) ABSTRACT

The invention relates to a component (1) having a fastening region (2) for a threaded connection, wherein the component has a surface (3) having fiber material (5) embedded and integrated into a matrix (4) in at least one layer, wherein the fiber material has a fiber course substantially parallel to the surface, wherein the surface has a fastening opening (6) having a center axis (7) arranged at an angle to the surface and wherein the fastening opening is provided for an internal thread (8). In the region of the fastening opening, the fiber material lying parallel to the surface is deflected, starting from the surface, in such a way that the fiber course of the fiber material after the deflection is at an angle to the surface that approaches the direction of the center axis. Furthermore, a tube (9) is formed by means of the deflected fiber material.
(Continued)

The invention further relates to a molded part and to a fastening part for such components.

11 Claims, 3 Drawing Sheets

(51) Int. Cl.
| | |
|---|---|
| *B29C 65/56* | (2006.01) |
| *B29C 65/64* | (2006.01) |
| *B29C 65/00* | (2006.01) |
| *B29C 70/86* | (2006.01) |
| *F16B 5/02* | (2006.01) |
| *B29C 70/30* | (2006.01) |
| *B29L 31/00* | (2006.01) |
| *B29L 1/00* | (2006.01) |
| *F16B 11/00* | (2006.01) |
| *F16B 37/04* | (2006.01) |

(52) U.S. Cl.
CPC .............. *B29C 65/64* (2013.01); *B29C 66/21* (2013.01); *B29C 66/474* (2013.01); *B29C 66/721* (2013.01); *B29C 66/7394* (2013.01); *B29C 66/73751* (2013.01); *B29C 66/742* (2013.01); *B29C 70/30* (2013.01); *B29C 70/86* (2013.01); *F16B 5/02* (2013.01); *B29C 65/4835* (2013.01); *B29C 65/5057* (2013.01); *B29C 66/72141* (2013.01); *B29L 2001/00* (2013.01); *B29L 2031/737* (2013.01); *F16B 11/006* (2013.01); *F16B 37/048* (2013.01); *Y10T 428/1366* (2015.01)

(58) Field of Classification Search
CPC .......... Y10T 428/24322; B29C 70/083; B29C 70/205; B29C 70/222; B29C 65/561; B29C 66/474; B29C 66/4742; B29C 66/721

See application file for complete search history.

(56) References Cited

OTHER PUBLICATIONS

WIPO, "International Search Report", PCT Application No. PCT/EP2014/071960, dated Mar. 5, 2015, 10 pages.

\* cited by examiner

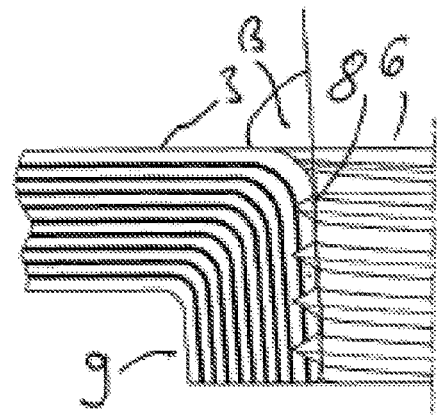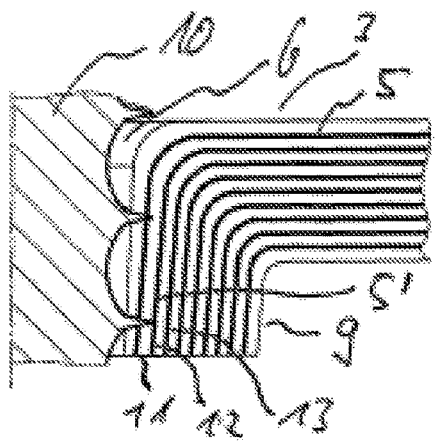
Fig. 3A    Fig. 3B
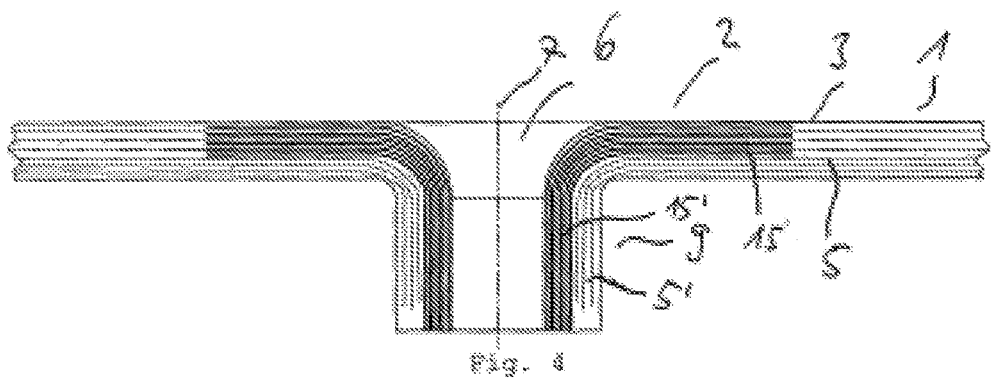
Fig. 4
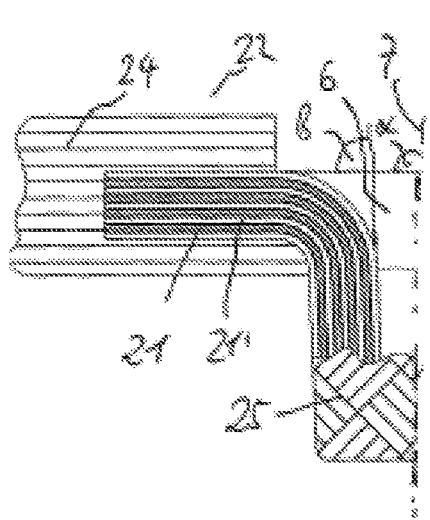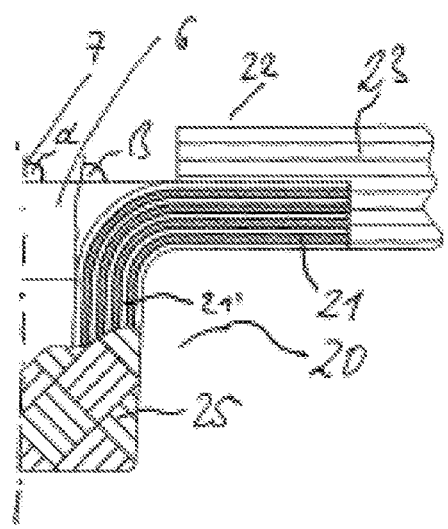
Fig. 5B    Fig. 5A

COMPONENT WITH A FASTENING REGION FOR A THREADED CONNECTION, TOGETHER WITH A MOULDED PART AND A FASTENING PART

PRIORITY

The present application claims priority under 35 U.S.C. § 371 to PCT Application PCT/EP2014/071960, filed on Oct. 14, 2014, which claims priority to German Patent Application No. 10 2013 220 718.2, filed on Oct. 14, 2013, the disclosures of which are hereby incorporated by reference in their entireties.

TECHNICAL FIELD

The invention concerns a component with a fastening region for a threaded connection, wherein the component has a surface with fibre material, embedded and bonded into a matrix composed of a binding agent in at least one layer, wherein the fibre material has a fibre course essentially parallel to the surface, wherein the surface has a fastening opening with a centre axis arranged at an angle to the surface, and wherein the fastening opening is provided for an internal thread.

Furthermore the invention concerns a moulded part for a threaded connection of a fibre material, such as an uncured thermosetting material reinforced with continuous fibres, or a woven fabric, a knitted fabric, or a knotted fabric, which can be bonded into a matrix.

A further subject of the invention is a component formed from the moulded part, or a fastening part for components.

PRIOR ART

A direct threaded fitting, that is to say, a screw-in process, in which a component provided with a thread-generating external thread, e.g. a screw, introduces a thread into a fastening opening of a nut material, in the case of a component that has a surface with fibre material embedded and bonded in at least one layer into a matrix composed of a binding agent, leads to the fact that the thread flanks of the external thread engaging with the fastening opening penetrate laterally into the fibre material, and the fibres of the fibre material, as seen in the screw-in direction, separate from one another.

This is in particular the case for holes that are subsequently introduced into CFRP sheets or moulded carbon parts by means of e.g. drilling or water jet cutting, where during the direct threaded fitting, by virtue of the wedge effect of the thread tips penetrating between the fibres. On the thread flanks the result is delamination between the individual fibres and the bonding matrix, which when load is applied can lead to destruction of the connection. Since, as a general rule, one is dealing with very thin-walled components, the screw-in depths are only very small, and only small tensile forces, or overturning torques, can be implemented.

From DE 10 2004 046 559 A1 a fastening means for purposes of fastening a component onto a support element, e.g. a sheet, a plastic part or a pressure cast part is of known art, wherein the support element has a simple passage without a thread, into which a double-threaded screw with a self-cutting or self-tapping thread, when it is screwed in, generates the thread in the passage required for purposes of fastening. When they are screwed into a fastening hole such external threads generate a corresponding counter-thread.

From DE 20 2011 103 246 U1 it is of known art in the case of plastic components to injection mould metal bushings with internal threads with a plastic mandrel, or to press them into a mandrel, for purposes of manufacturing a threaded connection. For this purpose the bushing is inserted into the injection-moulding tool.

The task of the invention consists in enabling a threaded fitting in a component, which component has a surface with fibre material, embedded and bonded into a matrix composed of a binding agent, and which has a fastening opening, such that the fibre material of the component is not separated, either as a result of the thread generation in the case of a direct threaded fitting, or when load is applied by the tensile forces.

Furthermore, a prefabricated moulded part, but one not yet hardened by a matrix is to be provided from a fibre material, wherein the moulded part after the curing of the matrix with production of the final strength, is suitable for thread generation for a direct threaded fitting, or for machined thread generation, and wherein, moreover, the fibre material in the cured moulded part is not separated by the tensile forces when load is applied.

Finally, with the use of a moulded part, a component or a fastening part for components is to be provided, which is suitable for thread generation for a threaded fitting, and, moreover, whose fibre material is not separated by the tensile forces when load is applied.

PRESENTATION OF THE INVENTION

The inventive component with a fastening region for a threaded connection has a surface with fibre material, embedded and bonded into a matrix composed of a binding agent, in at least one layer, wherein the fibre material has a fibre course essentially parallel to the surface. A fastening opening with a centre axis arranged at an angle to the surface is arranged in the surface, wherein the fastening opening is provided for an internal thread of a threaded connection. In the region of the fastening opening a deflection of the fibre material lying parallel to the surface takes place, starting from the surface, such that the fibre course of the fibre material after the deflection is at an angle to the surface that approaches the direction of the centre axis. Moreover a tube is formed with the deflected fibre material.

The said tube can, for example, be designed as an extension in the form of an open passage, or can be designed as a moulding having a fibre material, in particular can be designed as a blind hole.

By means of this configuration of the component, a screw-in point with an increased screw-in depth is created in the fastening region of the component, and on account of the particularly aligned course of the fibre material higher torques and pre-load forces can be accommodated, without the need for a significant increase in mass.

As a result of the deflection of the fibre course during the loading of the internal thread by the screw the fibre composite of the fibre material is no longer loaded between the fibre layers of the fibre material, but in the best case is only loaded orthogonal to the fibre course of the fibres of the fibre material. This counteracts any delamination of the component and enables a more robust threaded connection, and, in the case of thin-walled components, a greater screw-in depth.

In accordance with a further development the threaded connection can be a direct threaded fitting, in which the connecting element at the same time is the tool for purposes of forming the thread in the fastening opening, or the fastening opening can have a prefabricated internal thread. The centre axis of the fastening opening can be aligned in the direction of the threaded connection that is to be provided.

As a result of the deflection of the fibre course, when the screw forms the thread during the screwing-in process, the fibre composite of the fibre material is no longer severed between the fibres, but in the best case only orthogonal to the fibre course of the fibres of the fibre material. This counteracts any delamination of the component during the introduction of the internal thread.

Also in the case of a prefabricated internal thread that is introduced into the component, the ability of the threaded connection to withstand load is improved, because as a result of the alignment of the fibre course with the centre axis of the tube on the one hand, together with the centre axis of the threaded connection on the other hand, essentially only forces parallel to the fibre course must be accommodated.

In the at least one layer the fibre material is advantageously designed as a woven fabric, a knitted fabric, or a knotted fabric, wherein in particular a plurality of layers are provided, which are connected with one another.

This design of the fibre material advantages the provision of a component with a surface. By the arrangement of a plurality of layers the material thickness of the component can be adjusted in accordance with the requirements.

Additional fibre material can advantageously be introduced in the region of the fastening opening, which material is connected with both the surface and also with the tube. By this means it is possible to provide specific reinforcement of the component in the region of the threaded connection, without the need for the whole component to have a greater material thickness.

The inventive moulded part, which consists of a fibre material, such as an uncured thermosetting material reinforced with continuous fibres, or a woven fabric, a knitted fabric, or a knotted fabric, which can be bonded into a matrix, has a two-dimensional connecting region, with fibre material running parallel to the connecting region, by means of which a connection with a surrounding component can be produced. Furthermore, the moulded part has a fastening opening with a centre axis, wherein the fibre material is deflected in the region of the fastening opening, starting from the connecting region. As a result of the deflection the fibre course of the fibre material after the deflection stands at an angle to the connecting region, wherein the angle approaches the direction of the centre axis. A tube is formed with the deflected fibre material.

The moulded part itself is not yet cured, and therefore does not yet have the necessary final strength for the threaded connection. Such moulded parts can, for example, consist of pre-preg material, that is to say, pre-impregnated fibres, which in the non-hardened state can be incorporated into what is as yet an non-hardened component, and together with the latter can then be brought up to the final strength, for example, by curing a binding agent in a matrix. However, also conceivable are moulded parts as pure fibre knitted fabrics or knotted fabrics, which at a later point in time, that is to say, after introduction into a component structure, are impregnated with a binding agent, and the latter is then hardened.

The centre axis of the tube can advantageously be aligned in the direction of a threaded connection that is to be provided. This can, for example, be achieved in that, starting from a two-dimensional connecting region, a knitted fabric of the tube is knitted on with an appropriately aligned central axis.

After the curing of the matrix the moulded part can advantageously provide a tube with a fastening opening, which is suitable for a direct threaded fitting, or the fastening opening can be provided with an internal thread.

An inventive component has such a moulded part, which is connected via the connecting region into the component.

The integration of the moulded part into the component ensures that, despite a low wall thickness of the component a robust fastening point can be implemented with an appropriately greater screw-in depth and with a large tightening torque that can be achieved for the threaded fitting. Furthermore, the advantages of a fibre course deflected into the direction of the threaded fitting thus come into effect in an unrestricted manner.

An inventive fastening part has a moulded part bonded into a cured matrix as described above, wherein the cured connecting region can be used both for the production of a connection by means of adhesive bonding or lamination and also as a supporting region for a further component that is to be screwed on.

Such a fastening part can be designed as a separate part of a threaded connection.

Force application surfaces can advantageously be present on the connecting region, or on the tube.

A further inventive component is permanently connected with the connecting region of the above-cited fastening part by means of adhesive bonding or lamination.

Here the fastening part can serve for the production of the threaded connection in an already prefabricated component, which itself is not designed for the accommodation of a threaded connection.

In accordance with an advantageous further development of all the inventive subjects, at least 50% of the fibre material can consist of carbon fibres. Such a fibre material is used in lightweight constructions, and has a high strength with thin wall thicknesses.

In accordance with an advantageous further development of all the inventive subjects, the fastening opening can be designed as a passage opening, or as a blind hole.

In the case of a blind hole sealed threaded connections can be provided; in the case of a passage opening the length of the threaded connection, however, does not play any role.

BRIEF DESCRIPTION OF THE FIGURES

The inventive component is explained with the aid of the figures. Here:

FIG. 3A shows the fastening opening from FIG. 2 with a metric thread introduced.

FIG. 3B shows the fastening opening from FIG. 2 with a screw of a direct threaded fitting introduced;

FIG. 4 shows the fastening opening with additional fibre material with deflected fibres;

FIG. 5A shows a moulded part of woven fabric, a knitted fabric, or a knotted fabric in partial cross-section;

FIG. 5B shows a moulded part of woven fabric, a knitted fabric, or a knotted fabric in partial cross-section;

EXAMPLES OF EMBODIMENT OF THE INVENTION

Figure 1:
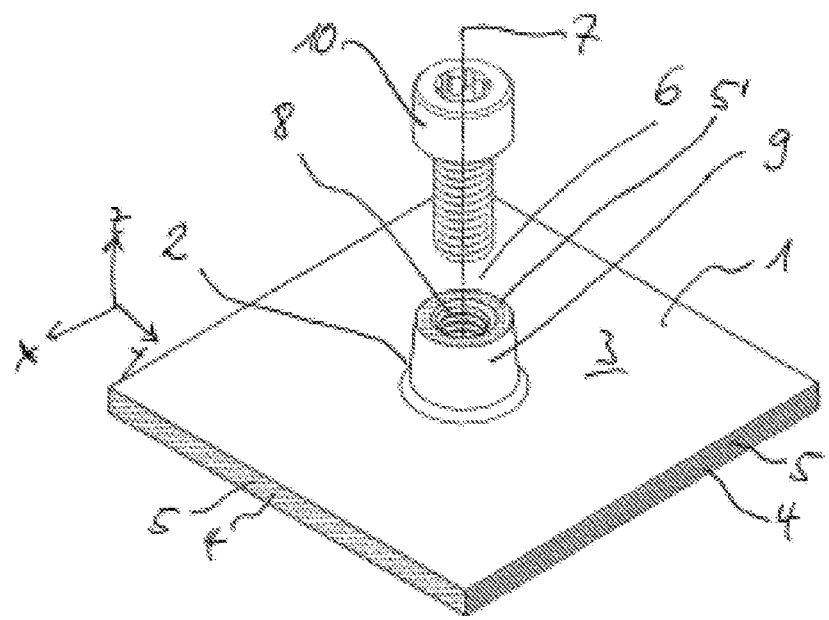
FIG. 1 shows a multi-layer two-dimensional component with a fastening opening with a fastening region in the form of a tube.

FIG. 1 shows the component 1 with a fastening region 2 for a threaded connection, wherein a screw used in an exemplary manner for purposes of providing the threaded connection is represented by dashed lines at a distance from the fastening region 2. However, the fitting of the screw as a general rule advantageously takes place in the opposite direction. As shown in FIG. 1, the threaded connection and the component 1 may represent a kit, where the threaded connection is disposable within the component 1 as disclosed herein.

The component 1 has a surface 3 extending in an x-y plane with fibre material 5, embedded and bonded into a matrix 4 composed of a binding agent, wherein the fibre material 5 has a fibre course essentially parallel to the surface 3, which is independent of whether the surface 3 is curved or not.

The surface 3 has a fastening opening 6 with a centre axis 7 arranged at an angle alpha (FIG. 2) to the surface 3, wherein in the example shown the fastening opening 6 is provided with an internal thread 8, which, however, does not necessarily have to be present. In the fastening region of the fastening opening 6, a deflection of the fibre material 5 lying parallel to the surface 3 takes place, starting from the surface 3, such that the fibre course of the fibre material 5 after the deflection is at an angle beta (FIG. 2) to the surface 3, which approaches the direction of the centre axis 7.

Here a tube 9 is formed with the deflected fibre material 5, which tube 9 projects beyond the surface 3.

The centre axis 7 of the fastening opening 6 is aligned with the screw 10 in the direction of the threaded fitting, and in particular this is also the case if the fastening opening 6, other than as represented, does not have a prefabricated internal thread 8, but rather is a direct threaded fitting, in which the connecting element at the same time is the tool for purposes of forming the thread in the fastening opening 6.

Figure 2:
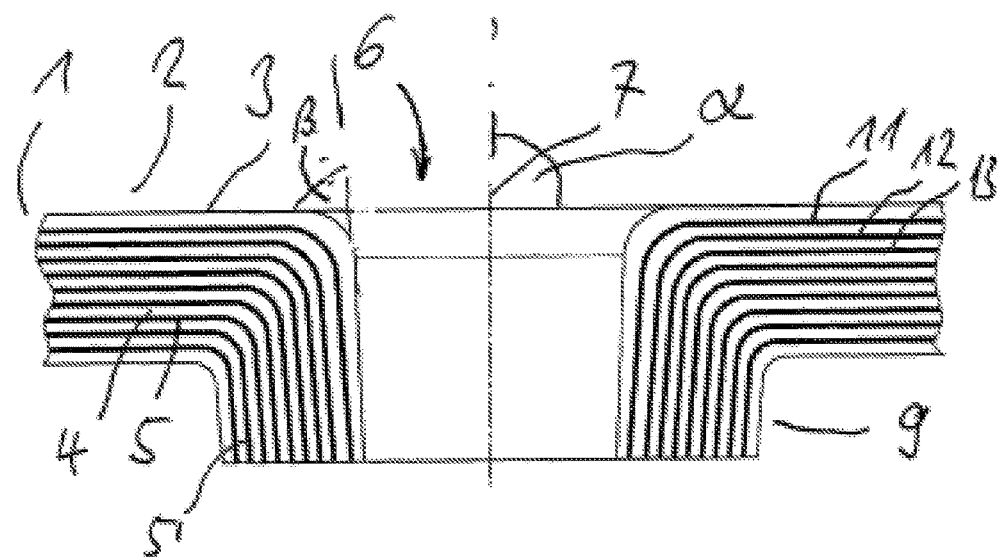
FIG. 2 shows a detail of the component from FIG. 1 with a fastening opening in cross-section.

As represented in the cross-section of the component 1 in FIG. 2, the fibre material 5 is designed in a plurality of layers 11, 12, 13, etc., and in the fastening region 2 around the fastening opening 6 a deflection of the fibre material 5 takes place from the surface 3 into the tube 9, which is made clear with the new reference symbol 5' for the deflected fibre material. In the present case the centre axis 7 of the fastening opening 6 stands at right angles to the surface 3; however, other angles can also be provided for a threaded connection. The tube 9 with the deflected fibre material 5' stands at an angle beta to the surface 3, wherein the angle beta corresponds essentially to the angle alpha, i.e. the deviation is less than 30°.

FIG. 3A represents the tube 9 from FIG. 2 with a metric internal thread 8 introduced into the fastening opening 6, wherein, on account of the inclination of the tube 9 with the angle beta relative to the surface 3, the thread is not fully formed over the whole height of the tube 9.

It is to be discerned that while the base of the thread 8 that is introduced penetrates into the fibre material 5', when load is applied the said fibre material 5' is, however, primarily loaded in the direction of the fibre course.

This becomes even clearer in FIG. 3B, in which a screw 10 with a thread is introduced into the fastening opening 6 for a direct threaded fitting. The tips of the thread 10 have embedded themselves into the fibre material 5' of the tube 9 that has been deflected relative to the fibre material 5 in the surface 3, without thereby splitting open the fibre composite, since the penetration of the thread tips takes place essentially at right angles to the fibre course of the plurality of layers 11-13 in the tube 9.

FIG. 4 represents a fastening opening 6 as a passage opening, wherein additional fibre material 15 is provided, which extends from the fastening region 2 into the tube 9, and which is connected with both the surface 3 and also the tube 9. The said additional fibre material 15 allows the tube 9 to be lengthened, without the fibre material 5 present in the surface 3 of the component 1 being limited.

FIGS. 5A, 5B represent in a partial cross-section a moulded part 20 of a fibre material 21, such as an uncured thermosetting material reinforced with continuous fibres, which is also designated as a pre-preg, or a woven fabric, a knitted fabric, or a knotted fabric, which in a later step of the treatment can be bonded into a matrix. Over a two-dimensional connecting region 22, with fibre material 21 running parallel to the connecting region 22, a connection to a surrounding component 23, 24 is produced, whereby in the case of component 23 in FIG. 5A the fibre material 21 of the connecting region 22 is bonded on one side into the fibre material of the component 23, whereas in the case of component 24 in FIG. 5B the fibre material 21 of the connecting region 22 is bonded on both sides into the fibre material of the component 24. This occurs as a function of the direction of action of the forces that are to be introduced into the component. For the surrounding component 24 the moulded part 20 represents a fastening point for a threaded connection. In the example of embodiment in accordance with FIG. 5A the forces are predominantly introduced as tensile forces into the fastening point. In the example of embodiment in accordance with FIG. 5B the forces can be introduced as tensile forces, but also as compression or shear forces, via the fastening point into the component.

The moulded part has a fastening opening 6 with a centre axis 7, and in the region of the fastening opening 6, starting from the connecting region 22, the fibre material 21 is deflected such that after the deflection of the fibre material 21 the fibre course stands at an angle beta to the connecting region 22, which approaches the direction of the centre axis 7 with an angle alpha relative to the connecting region 22, and in that a tube 25 is formed with the deflected fibre material. The centre axis 7 of the fastening opening 6 is aligned in the direction of the threaded connection that is to be provided, and can be designed as a passage opening, or as a closed blind hole.

After the curing of the matrix 22 the moulded part provides a fastening opening 6, which is suitable for a direct threaded fitting, in which the connecting element at the same time is the tool for purposes of forming the thread in the fastening opening 6, or which can be provided with an internal thread.

Figure 6A:
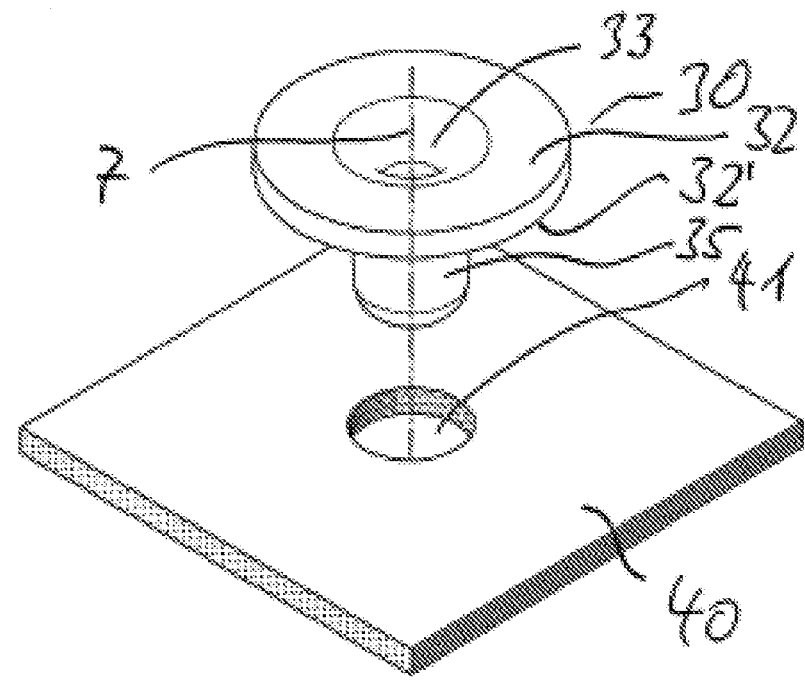
FIG. 6A shows a fastening part, before the introduction into a component.

FIG. 6A shows a fastening part 30 with a fastening opening 33 before introduction into a component 40 with a fastening region 41 for a threaded connection to be produced later along the central axis 7. Depending upon requirements, the bonding into the component structure can take place by means of multi-layer lamination in a similar manner to FIG. 5A, 5B, but also by means of adhesive bonding of the upper or lower side of the connecting region 32, 32' with the component 40.

The fastening part 30 has a moulded part bonded into a cured matrix, with a connecting region, wherein the cured connecting region 32 is designed both for the production of a connection by means of adhesive bonding or lamination with the component 40, and also as a supporting region on the component 40.

Figure 6B:
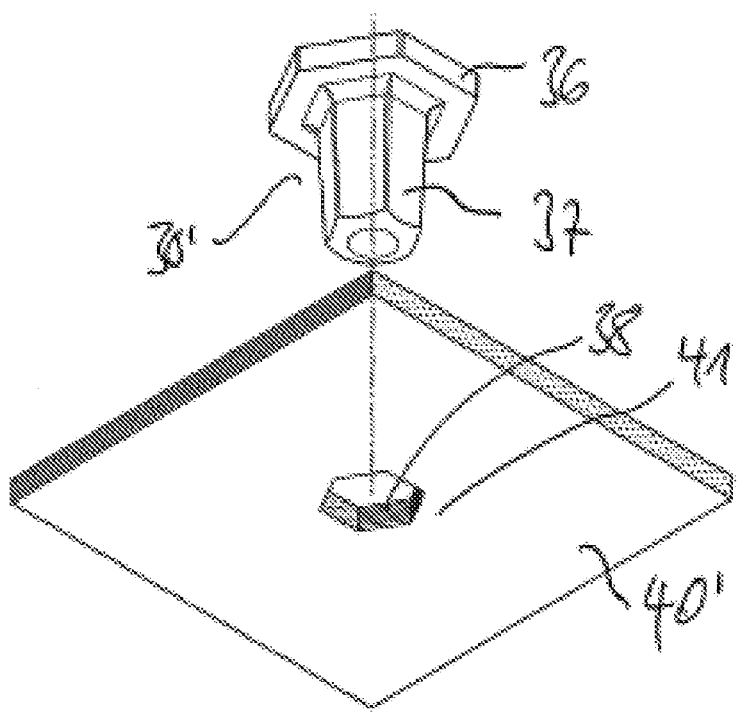
FIG. 6B represents force application surfaces present on a connecting region.

FIG. 6B represents the force application surfaces 36, 37 present on the connecting region 32, or on the tube 35, wherein the force application surfaces 37 on the tube 35 interact with corresponding counter-surfaces of the fastening region 41, if the fastening part 30' is introduced into the component 40'.

It is readily understood that the component can be permanently connected with the connecting region of the fastening part by means of adhesive bonding or lamination.

In principle both directions along the centre axis 7 can be conceived as a direction for the threaded connection. In the case of a threaded connection from above to below, however, the fastening part would have to be connected from below with the component 40. However, all degrees of freedom are open to the designer; also the fastening opening can be designed as a passage opening or as a blind hole.

The invention claimed is:

1. A kit comprising:
a threaded connection; and
a component with a substantially tubular and elongated fastening region for the threaded connection disposable within the substantially tubular and elongated fastening region, wherein the component has a surface with fibre material embedded into a matrix in at least one layer, wherein the fibre material has a fibre course essentially parallel to the surface, wherein in the substantially tubular and elongated fastening region the surface has a fastening opening with a centre axis arranged at an angle alpha to the surface, wherein the fastening opening is provided for an internal thread within the substantially tubular and elongated fastening region, characterised in that the threaded connection is a direct threaded fitting with a connecting element, whereby the connecting element is to be used for forming the thread in the fastening opening on the tube, or in that the tube has a prefabricated internal thread, and in that the centre axis of the tube is aligned in the direction of the threaded connection to be provided, and further characterised in that in the region of the fastening opening, a deflection of the fibre material lying parallel to the surface in the substantially tubular and elongated fastening region takes place, starting from the surface, such that after the deflection the fibre course of the fibre material is at an angle beta to the surface that approaches the direction of the centre axis, and in that a tube of the substantially tubular and elongated fastening region is formed with the deflected fibre material.

2. The kit in accordance with claim 1, characterised in that in the at least one layer the fibre material is designed as a woven fabric, a knitted fabric, or a knotted fabric, wherein a plurality of layers are provided, which are connected with one another.

3. The kit in accordance with claim 2, characterised in that additional fibre material is introduced in the substantially tubular and elongated fastening region of the fastening opening, which material is connected with both the surface and also the tube.

4. A kit comprising:
a threaded connection; and
a component including a moulded part of a fibre material including an uncured thermosetting material reinforced with continuous fibres, or a woven fabric, a knitted fabric, or a knotted fabric, which can be bonded into a matrix, characterised in that a two-dimensional connecting region is present, with fibre material running parallel to the connecting region, by means of which a connection can be manufactured with a surrounding component, in that the moulded part has a fastening opening with a centre axis, and in that the fibre material in the region of the fastening opening, starting from the connecting region, is deflected into a tube, such that after the deflection the fibre course of the fibre material stands at an angle beta to the connecting region, which approximates to the direction of the centre axis, and in that a tube of a substantially tubular and elongated fastening region is formed with the deflected fibre material, characterised in that the central axis of the tube is aligned in the direction of the threaded connection to be provided, and further characterised in that after the curing of the matrix the moulded part provides a tube with a fastening opening, which is suitable for a direct threaded fitting with a connecting element, in which the connecting element at the same time is the tool for purposes of forming the thread in the fastening opening, or in that the fastening opening can be provided with an internal thread.

5. The component with a substantially tubular and elongated fastening region for the threaded connection, characterised by a moulded part in accordance with claim 4, wherein by means of the connecting region, the moulded part is fully integrated into the component.

6. A fastening part, characterised by a moulded part, in accordance with claim 4, bonded into a cured matrix, wherein a cured connecting region is designed both for the manufacture of a connection by means of adhesive bonding or lamination, and also as a supporting region.

7. The fastening part in accordance with claim 6, characterised in that force application surfaces are present on the connecting region or on the tube.

8. A component with a fastening part in accordance with claim 7, characterised in that the component is permanently connected with the connecting region of the fastening part by means of adhesive bonding or lamination.

9. The component, moulded part, or fastening part in accordance with one of the claim 8, characterised in that at least 50% of the fibre material consists of carbon fibres.

10. The component, moulded part, or fastening part in accordance with one of the claim 9, characterised in that the fastening opening is designed as a passage opening, or closed.

11. An assembly comprising:
a threaded connection; and
a component with a substantially tubular and elongated fastening region including the threaded connection disposed within the substantially tubular and elongated fastening region, wherein the component has a surface with fibre material embedded into a matrix in at least one layer, wherein the fibre material has a fibre course essentially parallel to the surface, wherein in the substantially tubular and elongated fastening region the surface has a fastening opening with a centre axis arranged at an angle alpha to the surface, wherein the fastening opening is provided with an internal thread within the substantially tubular and elongated fastening region, wherein the internal thread is formed by a complementary external thread of the threaded connection to retain the threaded connection within the substantially tubular and elongated fastening region, characterised in that in the region of the fastening opening, a deflection of the fibre material lying parallel to the surface in the substantially tubular and elongated fastening region takes place, starting from the surface, such that after the deflection the fibre course of the fibre material is at an angle beta to the surface that approaches the direction of the centre axis, and in that a tube of the substantially tubular and elongated fastening region is formed with the deflected fibre material.

* * * * *